Jan. 20, 1925.

V. L. CHAMBERLIN 1,523,401

DETECTOR TIP

Filed Feb. 1, 1924

INVENTOR.
VERN L. CHAMBERLIN
BY
ATTORNEY.

Patented Jan. 20, 1925.

1,523,401

UNITED STATES PATENT OFFICE.

VERN L. CHAMBERLIN, OF PONTIAC, MICHIGAN.

DETECTOR TIP.

Application filed February 1, 1924. Serial No. 689,970.

*To all whom it may concern:*

Be it known that I, VERN L. CHAMBERLIN, a citizen of the United States, residing at Pontiac, county of Oakland, State of Michigan, having invented a certain new and useful Improvement in Detector Tips, and declare the following to be a full, clear, and exact description of the same, such as will enable others skilled in the art to which it pertains to make and use the same, reference being had to the accompanying drawings, which form a part of this specification.

This invention relates to crystal detectors for radio use and the object of the invention is to provide a support for the detector wire by which the contact with the crystal is made. The sensitive points on the usual crystal are very minute and in order to make direct contact with these points it is necessary to use a detector wire or cat whisker of very small diameter. In fact the best wire to use is a silver wire of about five thousandths of an inch in diameter but on account of the extreme thinness of this wire it cannot be used with the ordinary detector as it will break very readily at its point of support. For this reason the usual cat whiskers now in use are formed of spring metal of considerable thickness to embody the necessary inherent strength but when placed on a crystal the end thereof is so much larger in diameter than the sensitive points of the crystal that a good contact therewith cannot readily be made. For this reason the usual crystal detector is not nearly as efficient as it might be. The object of this invention is to provide a crystal detector in which a silver wire of approximately five thousandths of an inch in diameter is flexibly supported intermediate its ends and may be used to increase the sensitiveness and range of the crystal. Another object of the invention is to provide a detector tip utilizing a detector wire of very small diameter and provided with a coiled spring for flexibly supporting the wire in such a manner that it will not readily break at the point where it is mounted on the base. Another object of the invention is to provide a detector tip which may be utilized with practically all types of crystal detectors. These objects and the several novel features of the invention are hereinafter more fully described and claimed and the preferred form of construction by which these objects are attained is shown in the accompanying drawings in which—

Figure 1:
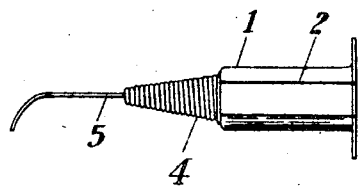
Fig. 1 is a greatly enlarged elevation of a detector tip embodying my invention.
Figure 2:
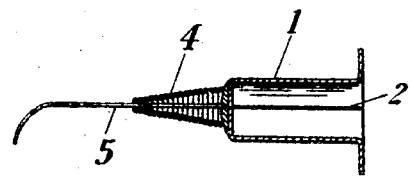
Fig. 2 is a longitudinal section therethrough.
Figure 3:
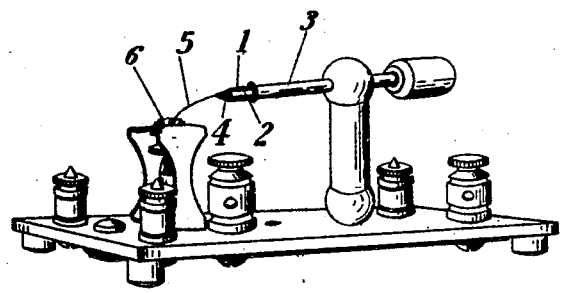
Fig. 3 is a perspective view of the crystal detector showing my improved detector tip as used therewith.

As shown in Figs. 1 and 2 a cap 1 is provided having several longitudinal slots 2 by which the tip may be fitted over supporting rods 3 of slightly different sizes as shown in Fig. 3. A conical coiled spring 4 of very fine wire is soldered to the end of the cap 1 as shown in Figs. 1 and 2. The silver detector wire 5 extends through and is supported in the conical spring 4 intermediate its ends and is also soldered to the end of the cap 1 as shown in Fig. 1. This silver detector wire is about five thousandths of an inch in diameter and is very flexible so that it may be bent in any direction desired and the spring 4 is closely coiled and is adapted to move sideways with any movement of the detector wire 5, the spring tending at all times to return to its original position shown in Figs. 1 and 2 and fitting closely about the detector wire 5 at the small end.

In use the cap 1 is fitted over the end of the rod 3 and the rod is moved about thus moving the point of the detector wire 5 over the crystal 6 until one of the sensitive points previously referred to is found, the detector wire 5 being pushed down onto the crystal so that the conical spring 4 is forced to one side to a slight extent and the tendency of the coiled spring to return to the normal position shown in Fig. 2 holds the end of the detector wire constantly in contact with the sensitive point on the crystal. By supporting the detector wire by means of the conical coiled spring 4 intermediate its ends the detector wire cannot be bent sufficiently to cause the end thereof to break at the point where it is secured to the cap and thus the spring acts to prevent breakage of the wire 5 as well as to place a tension thereon to hold it in contact with the sensitive points on the crystal. The wire 5 is so fine that the end thereof may be easily bent in any direction desired for contacting different points on the crystal and the cap 1 and spring 4 are preferably made of brass or copper or any other metal of good conductivity so that no electric losses occur while current is passing through the wire 5. While the detector wire 5 is apparently of considerable diameter in Figs. 1 and 2 this is due to the enlargement necessary to show the construction and the actual detector tip is more nearly of the size shown in Fig. 3.

From the foregoing description it becomes evident that the device is very simple and efficient in operation, is composed of few parts and is of consequent low manufacturing cost, may be used to replace the cat whisker of the usual crystal detector and provides a device which accomplishes the objects described.

Having thus fully described my invention, its utility and mode of operation, what I claim and desire to secure by Letters Patent of the United States is—

1. A detector tip comprising a cylindrical cap closed at one end and having a series of longitudinal slots, a very fine detector wire extending from the closed end of the cap and a conical coiled spring extending from the end of the cap about the detector wire, the end of the conical spring fitting closely about the detector wire and supporting its intermediate its ends.

2. A detector tip comprising a cap adapted to fit over the movable detector rod of a crystal detector, a detector wire of small diameter soldered at one end to the end of the said cap and a conical coiled spring soldered to the end of the said cap and supporting the detector wire intermediate its ends.

3. A detector tip comprising a cap adjustable to receive detector rods of varying sizes, a detector wire of small diameter extending from the end of the cap and a conical coiled spring formed of fine wire extending from the end of the cap about the detector wire and supporting the detector wire intermediate its ends.

4. A detector tip comprising a cap adapted to fit the movable detector rod of a crystal detector, a coiled spring secured to and extending from the end of the cap, a detector wire of high conductivity secured to the end of the said cap and extending through the coiled spring, the said coiled spring supporting the detector wire intermediate its ends of the terminal end of the detector wire being bent at an angle to the body thereof.

5. A detector tip comprising a member having a coiled spring secured to the end thereof, and a detector wire of very fine diameter secured to the end of the said member and extending through the coiled spring, the said coiled spring supporting the detector wire intermediate its ends.

In testimony whereof, I sign this specification.

VERN L. CHAMBERLIN.